Figure 1:
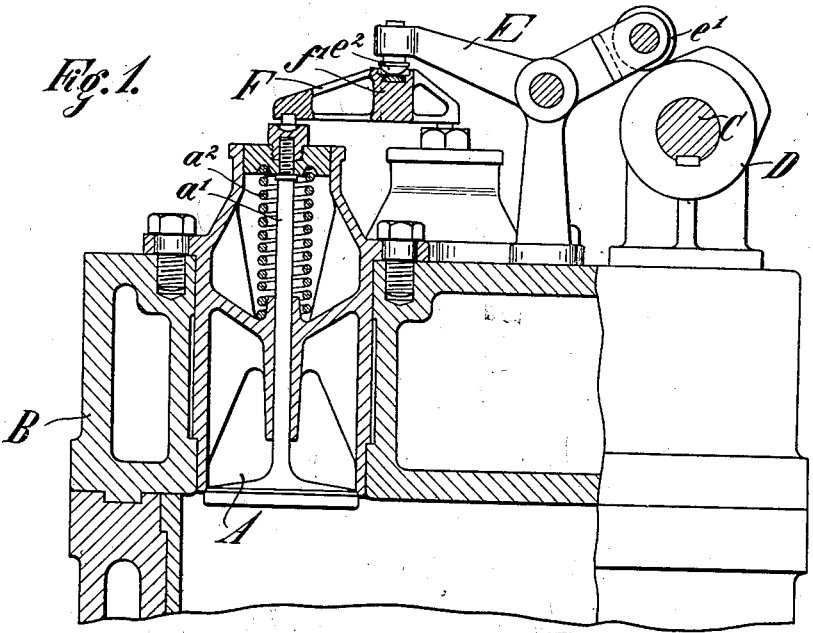

E. HERKT.
VALVE GEAR.
APPLICATION FILED MAY 27, 1912.

1,172,358.

Patented Feb. 22, 1916.

Witnesses
J. M. Wynkoop.
L. T. Stanley.

Inventor
Ernst Herkt,
By Knight Bros
Attorneys.

UNITED STATES PATENT OFFICE.

ERNST HERKT, OF KIEL, GERMANY, ASSIGNOR TO FRIED. KRUPP AKTIENGESELL-SCHAFT, GERMANIAWERFT, OF KIEL-GAARDEN, GERMANY.

VALVE-GEAR.

1,172,358.   Specification of Letters Patent.   Patented Feb. 22, 1916.

Application filed May 27, 1912. Serial No. 699,896.

*To all whom it may concern:*

Be it known that I, ERNST HERKT, a citizen of the German Empire, residing at Kiel, Germany, have invented certain new and useful Improvements in Valve-Gears, of which the following is a specification.

This invention relates to a valve gear which enables a number of valves to be operated in the same manner by means of only one operating device, and is intended first and foremost for two stroke cycle internal combustion engines, the valves of which are placed in the cylinder cover.

In engines of this kind it is necessary on constructional grounds to divide up the necessary scavenging valve area. The arrangement of three scavenging valves for each cylinder has been found in particular to be very suitable because three valves can be well arranged on the cylinder cover and also afford the possibility of providing a sufficiently large area of flow for the scavenging air without materially reducing the strength of the cylinder cover and furthermore permit of an advantageous arrangement of the fuel and starting valves. The arrangement of a separate cam disk and operating lever for each of the three scavenging valves is however scarcely possible, as there is only a space corresponding to the diameter of the cylinder cover for the accommodation of the cam disks.

Now the object of this invention is to simplify the construction of such valve gears as much as possible.

A constructional example of the subject matter of the invention is shown in the drawing in which—

Figure 2:
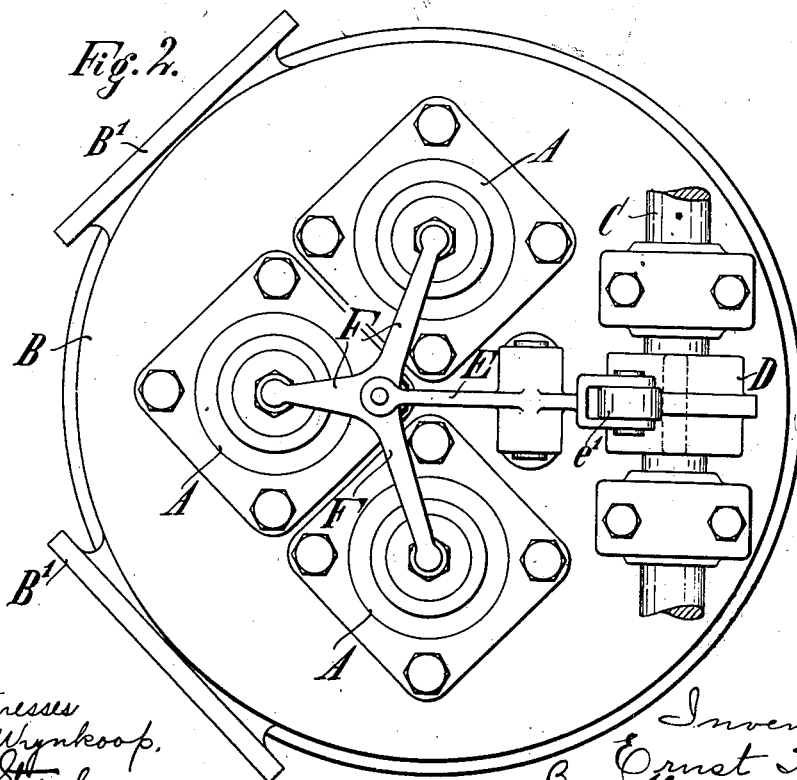

Figure 1 is a side elevation, partly in section, of a valve gear for the scavenging valves of a two stroke cycle internal combustion engine and of the appurtenant parts of the engine cylinder, and Fig. 2 is the top plan corresponding to Fig. 1.

A denotes the three scavenging valves which are placed in the cylinder cover B of the engine and open toward the interior of the cylinder in the well known way. The three scavenging valves communicate by two connecting pipes $B^1$ (Fig. 2) with an air pump (not shown) and are operated by a separate valve shaft C through a single cam disk D and through the medium of a single operating lever E. This rocking operating lever carries on one end an operating roller $e^1$ and on its other end a bolt $e^2$ formed with a spherical surface on its other end. The transmission of the oscillations of the operating lever E to the valves A is effected through the medium of an intermediate piece F, which is mounted on the valve spindles $a^1$ and is in the form of a three armed lever and the middle part $f^1$ of which is pressed against the spherical surface of the bolt $e^2$ of the operating lever E under the action of the valve springs $a^2$.

The number of valve-stems $a^1$ and the relation of the intermediate piece F to these stems and to the operating lever E are such that said intermediate piece constitutes a true floating lever. That is to say, no part of the intermediate piece is fixed, or confined in any definite position, in the direction of operation, but said intermediate piece is capable of not only bodily movement in the direction of its operation, but of oscillatory movement relatively to the operating lever and to every valve; so that in the operation of any one valve the other valves act as a fulcrum, while the operating lever serves as power. This is important for two main reasons. First, because it prevents any one valve moving in advance of or retarding the movement of the other valves; and, second, because it greatly simplifies the construction, as well as the assembly and adjustment of the parts.

The action of the above described scavenging valve gear will be understood without further explanation and does not therefore need to be further described. It has the advantage that each oscillation of the operating lever E causes a movement of equal magnitude of the valve spindle of each of the three valves and the valves can therefore be made exactly the same.

I claim:

In a two stroke cycle internal combustion engine, a cylinder having in its cover three scavenging valves, each valve being closed by a spring and provided with a guide for its stem, a single operating lever and a floating intermediate piece in the form of a three-armed lever through which said operating lever opens all of said valves simultaneously, the ends of the arms of the intermediate piece resting freely by means of spherical surfaces on the correspondingly shaped ends of the valve stems; the middle part of the intermediate piece being provided on its upper surface with a spherical seat engaged by a correspondingly shaped bolt of the operating lever, the length of the arms and the position of the valves being such that in transmitting power to any one valve, the stems of the two other valves act as fulcrums for the intermediate piece.

In testimony whereof I have affixed my signature in presence of two witnesses.

ERNST HERKT.

Witnesses:
FERDINAND ROHWESEN,
OTTO GEELHAAR.